(12) United States Patent
Medina

(10) Patent No.: US 11,268,542 B2
(45) Date of Patent: Mar. 8, 2022

(54) ACTUATOR CONTROL VALVE ARRANGEMENT

(71) Applicant: GOODRICH ACTUATION SYSTEMS SAS, Bue (FR)

(72) Inventor: Raphael Medina, Écouen (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 132 days.

(21) Appl. No.: 16/710,370

(22) Filed: Dec. 11, 2019

(65) Prior Publication Data
US 2020/0255126 A1 Aug. 13, 2020

(30) Foreign Application Priority Data

Feb. 11, 2019 (EP) .................................... 19305168

(51) Int. Cl.
| | |
|---|---|
| *B64C 13/50* | (2006.01) |
| *F15B 11/12* | (2006.01) |
| *F15B 11/08* | (2006.01) |
| *F15B 15/20* | (2006.01) |
| *F15B 20/00* | (2006.01) |

(52) U.S. Cl.
CPC .......... *F15B 11/123* (2013.01); *B64C 13/504* (2018.01); *F15B 11/08* (2013.01); *F15B 15/20* (2013.01); *F15B 20/002* (2013.01)

(58) Field of Classification Search
CPC ........ F15B 11/08; F15B 11/123; F15B 15/20; F15B 20/002; B64C 13/504
See application file for complete search history.

(56) References Cited

U.S. PATENT DOCUMENTS

| | | | |
|---|---|---|---|
| 2,596,471 A | * | 5/1952 | Densmore ............. F15B 11/123 91/167 R |
| 2,665,084 A | | 1/1954 | Feeney et al. |
| 3,386,690 A | | 6/1968 | Prilliman et al. |

(Continued)

FOREIGN PATENT DOCUMENTS

| | | |
|---|---|---|
| DE | 102004044962 A1 | 4/2006 |
| FR | 3064595 A1 | 10/2018 |

(Continued)

OTHER PUBLICATIONS

European Search Report for European Application No. 19305168.7, Application Filing Date Feb. 11, 2019, dated Jul. 23, 2019, 8 pages.

*Primary Examiner* — Thomas E Lazo
(74) *Attorney, Agent, or Firm* — Cantor Colburn LLP

(57) ABSTRACT

An actuator control arrangement includes a hydraulic actuator having a housing and a piston rod axially moveable within the housing, a stop disposed within the housing to limit the extent of movement of the piston rod into the housing, and a solenoid valve arranged between a pressure source and the actuator. The solenoid valve is switchable between a first mode and a second mode in response to an electric control signal, wherein, in the first mode, the solenoid valve creates a fluid flow path from the pressure source to the actuator so as to locate the stop in its neutral position and in the second mode, the solenoid valve creates a fluid flow path to release pressure from the actuator to permit the stop to move to its retracted position. In the event of electrical failure, the stop will set the actuator to its neutral position.

5 Claims, 13 Drawing Sheets

(56) References Cited

U.S. PATENT DOCUMENTS

| | | | |
|---|---|---|---|
| 3,940,093 A | 2/1976 | Cabriere | |
| 5,067,323 A | 11/1991 | Bennett et al. | |
| 6,343,537 B1* | 2/2002 | Iida | F15B 11/123 92/13.1 |
| 6,408,740 B1* | 6/2002 | Holt | F15B 11/123 91/173 |
| 6,807,895 B2* | 10/2004 | Hirano | F15B 11/024 92/13.6 |
| 9,994,304 B2 | 6/2018 | Ito | |
| 2016/0096617 A1* | 4/2016 | Ito | B64C 13/505 92/51 |
| 2017/0314584 A1* | 11/2017 | Holtgraver | F15B 15/1409 |

FOREIGN PATENT DOCUMENTS

| | | |
|---|---|---|
| GB | 747507 | 4/1956 |
| NL | 1011893 C2 | 10/2000 |

* cited by examiner

Electrical failure → actuator self recentering

ACTUATOR CONTROL VALVE ARRANGEMENT

CROSS-REFERENCE TO RELATED APPLICATION

This application claims the benefit of European Application 19305168.7 filed Feb. 11, 2019, the disclosure of which is incorporated herein by reference in its entirety.

TECHNICAL FIELD

The present disclosure relates to valve arrangements for controlling a hydraulic actuator such as for positioning moveable surfaces such as spoilers in aircraft.

BACKGROUND

Hydraulic actuators find many applications, particularly in controlling movement of a moveable component. In aircraft, many moveable components and surfaces are moved by means of a hydraulic actuator.

In general terms, a hydraulic actuator comprises a cylindrical housing in which is mounted an axially moveable piston rod. A head of the rod, inside the housing, divides the housing into two chambers each having a fluid port via which pressurised fluid can be injected into the chamber or low pressure fluid exits the chamber, so as to change the relative pressure in the two chambers either side of the piston head, thus causing movement of the piston relative to the housing. A free end of the piston rod that extends out of the housing is attached to a component or surface to be moved. Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal.

As the piston rod moves relative to the housing, the moveable component or surface to which it is attached will move accordingly.

To allow both extension of the rod and retraction of the rod, a valve is provided to set the movement to extension or retraction. This may be a servovalve, more specifically an electrohydraulic servovalve (EHSV). The valve is positioned between the hydraulic fluid supply and the actuator and is moveable, in response to an electric control signal, between a first position in which high pressure fluid flows from the supply into one chamber of the actuator housing and low pressure fluid exits from the other chamber, and a second position in which high pressure fluid is injected into the other chamber and withdrawn from the first chamber of the actuator housing. The valve may also have a neutral or closed position in which fluid is neither supplied to nor withdrawn from the actuator housing.

One particular application for hydraulic actuators controlled by an EHSV is in controlling movement of a spoiler on the wing of an aircraft. A spoiler is a moveable surface mounted on an aircraft wing behind the wing flap. When the aircraft is cruising, both the wing flap and the spoiler lay flat along the wing. To reduce aircraft speed, the spoiler is raised upwards relative to the wing.

The spoiler movement is caused by a hydraulic actuator extending as described above.

If electric power is lost when the spoiler is extended, excessive drag could be exerted by the spoiler. Systems are known, therefore, to retract the spoiler to its 'zero' position in the housing in the event of electric power loss. Usually, this is by means of the EHSV being biased to a valve position where the high pressure fluid is provided to the chamber on the piston rod side of the piston head so that the pressure on that side of the head is greater than in the other chamber, causing the piston to retract into the housing. This will be described further below.

Conventionally, a mechanical stop inside the housing stops the piston rod at the zero position.

Problems can also occur in spoiler control if there is a loss of hydraulic power. Here a solution to prevent extension of the actuator, is an anti-extension valve between the EHSV and the actuator that is switched to a pressure relief position when the hydraulic pressure falls below a predetermined pressure (usually 1.2 times a given 'stall' pressure). Again this will be described further below.

If the spoiler is extended, and pressure is lost, the spoiler will be retracted by aerodynamic load, and will gradually drop to become aligned with the wing surface until the zero hinge position is reached. It is important to keep the spoiler at this position to prevent a spurious extension.

Most aircraft have a spoiler that operates using a positive stroke of the actuator rod—i.e. for extension of the rod to lift the spoiler. The stroke of the actuator is between a 'zero' position in the housing and an extended position and the control system is biased to return the rod to the zero position.

More recently, some aircraft have incorporated a 'droop' function in the spoiler, using a negative stroke of the piston rod—i.e. further back into the housing than the zero position or, put another way, a stroke moving from the zero position in the opposite direction to the direction moved in the positive stroke for extending the rod.

The droop function is used to lower the spoiler relative to the wing e.g. for high lift manoeuvers or to close a large air gap between the wing flap and the spoiler if the wing flap is extended.

A problem occurs in the area of overlap of the spoiler and the wing flap ranges of motion. If, for example, electrical power driving the spoiler is lost, the spoiler will, under its own weight or under pressure from the EHSV bias, press against the wing flap when not driven by the actuator, thus interfering with movement of the wing flap if retraction is demanded. In the event of hydraulic failure, the anti-extension valve will be activated and the flap will then overcome the anti-extension threshold to be able to push on the spoiler and thus return to its neutral position.

The inventors have, however, identified a need to provide a valve and piston assembly that prevents the spoiler and flap from interfering with each other, be re-centering the spoiler to its neutral position, particularly in the case of electrical failure.

SUMMARY

The arrangement of the disclosure allows the spoiler actuator to be re-centered to its zero or neutral position from negative stroke, in the event of electrical failure, by means of a moveable stop inside the actuator housing.

Specifically, there is provided an actuator control arrangement comprising: a hydraulic actuator having a housing and a piston rod axially moveable within the housing between a neutral position, a retracted position and an extended position with respect to the housing in response to application of pressure to the piston rod; a stop disposed within the housing to limit the extent of movement of the piston rod into the housing, the stop moveable between a neutral position and a retracted position; and a solenoid valve arranged between a pressure source and the actuator, the solenoid valve switchable between a first mode and a second mode in response to an electric control signal, wherein, in the first mode, the solenoid valve creates a fluid flow path from the pressure source to the actuator so as to locate the stop in its neutral position and in the second mode, the solenoid valve creates a fluid flow path to release pressure from the actuator to permit the stop to move to its retracted position.

The arrangement preferably also includes an electrohydraulic servovalve (EHSV) between the pressure source and the actuator to control the direction of pressurised fluid to the actuator in response to the electric control signal. The EHSV is preferably moveable between a first position in which high pressure fluid is directed from the fluid source to a first chamber of the actuator to cause extension of the piston rod and a second position whereby high pressure fluid is directed to a second chamber of the actuator to cause retraction of the piston rod with respect to the housing.

The default position of the EHSV is preferably the second position.

The arrangement preferably also includes an anti-extension valve provided between the EHSV and the actuator configured to move between a first position in which a fluid path is created between the EHSV and the actuator and a second, anti-extension position to prevent extension of the piston rod with respect to the housing in the event of pressure loss.

BRIEF DESCRIPTION OF THE DRAWINGS

The following descriptions should not be considered limiting in any way. With reference to the accompanying drawings, like elements are numbered alike.

Preferred embodiments will now be described by way of example only and with reference to the drawings.

DETAILED DESCRIPTION

Figure 1:
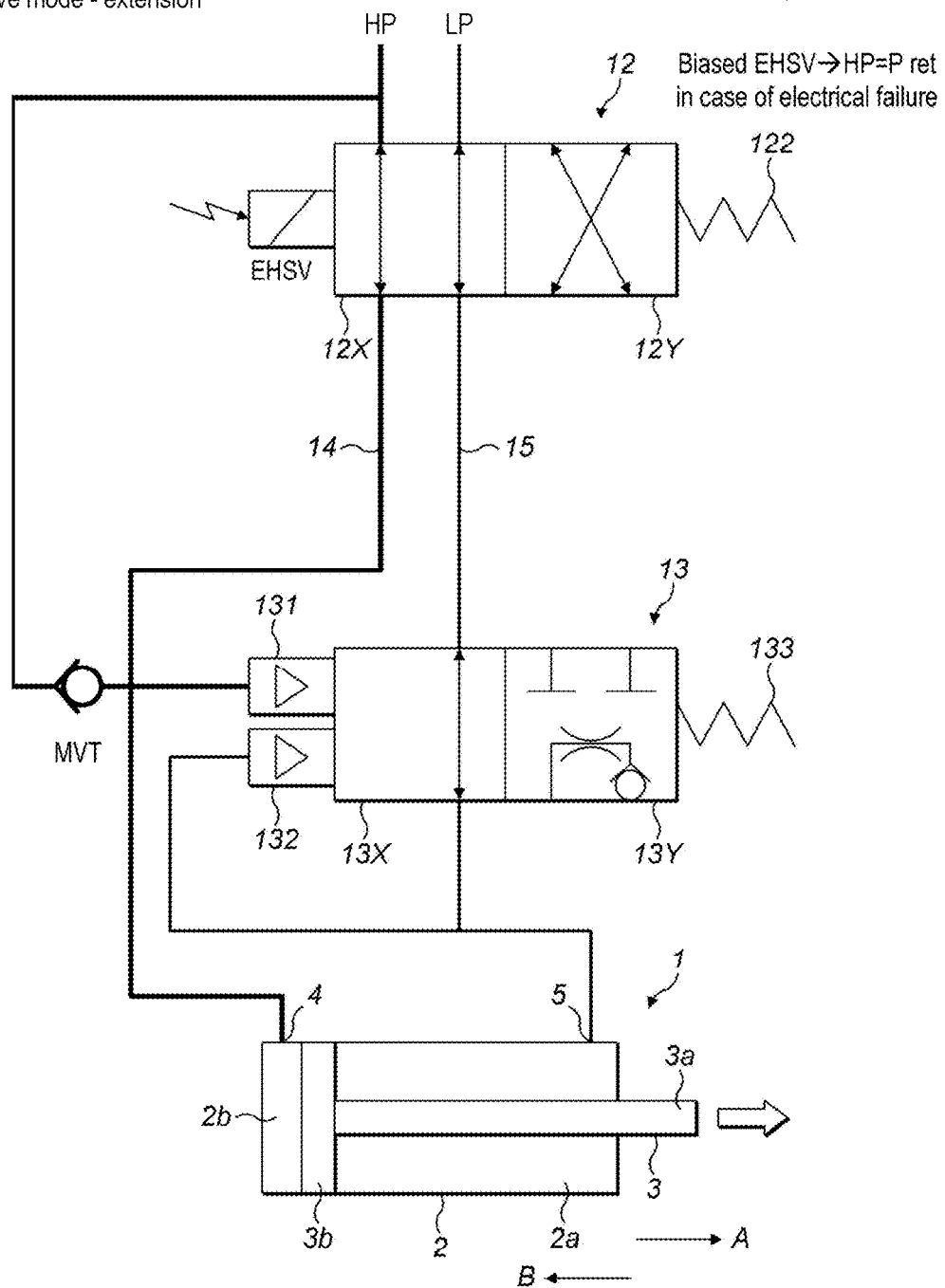
FIG. 1 is a schematic view of a conventional actuator control valve arrangement.

Referring to FIG. 1, a known positive stroke operation of an actuator control valve arrangement will first be described.

FIG. 1 shows a hydraulic actuator 1 comprising a housing 2 and a piston comprising a piston rod 3 axially moveable in the housing 2. Movement of the piston rod 3 relative to the housing 2 is caused by providing pressurised hydraulic fluid from a fluid supply 10 to the actuator 1 via ports 4,5 in the actuator housing 2 in response to an electric control signal. The piston rod has a free end 3a extending out of the housing and for attachment to the surface to be moved by the actuator (not shown). The other end of the piston rod inside the housing 2 has a piston head 3b that extends across the diameter of the housing 2 thus dividing the housing interior into two chambers 2a,2b—one on each side of the piston head 3b.

If the piston rod 3 is to be extended out of the housing 2, high pressure fluid from a source HP fluid is provided via a fluid line 14 into chamber 2b of the housing 2 via port 4 which causes the piston rod to move in the direction of arrow A. Fluid present in chamber 2a is thus forced from the housing 2, as the piston head moves through the housing, on the other side of the piston head, via port 5, on fluid line 15, to a reservoir (not shown) as low pressure (LP) fluid. If the piston rod 3 is to be retracted from the extended position, high pressure fluid is provided to chamber 2a via port 5 causing the piston rod 3 to move in the direction of arrow B and fluid is ejected from chamber 2b via port 4 to the reservoir.

The direction of fluid is controlled by a EHSV valve 12 which takes up different valve positions in response to the electric control signal (not shown). For extending the rod as described above, the EHSV valve is positioned at position 12X i.e. with the lines shown in 12X aligned with the fluid lines from the supply and to the reservoir.

For retraction of the piston rod 3, the fluid lines are reversed by the EHSV valve being at position 12Y. The EHSV may also have a neutral position where there is no fluid flow in either direction. The EHSV valve is preferably biased to position 12Y via EHSV spring 122. Thus, in the event of loss of electric power, the EHSV will revert to position 12Y to avoid extension.

A mechanical stop (not shown) in chamber 2b, stops the retracted rod at the 'zero' position.

To avoid extension of the actuator in the event of loss of hydraulic pressure, an anti-extension valve 13 is provided. The anti-extension valve 13 is usually in position 13X allowing fluid communication between the actuator and the EHSV 12, because the fluid pressure provided at ports 131 and 132 together exceed the force of the relief valve spring 133. In the event that of hydraulic failure, there is no pressure at port 131. The pressure created by a tensile load at port 132 is not enough to overcome the bias of the spring 133 and so the spring pushes the anti-extension valve 13 to position 13Y which holds the piston rod at the zero position.

In practice, end 3a of the piston rod 3 is attached to the component or surface to be moved e.g. the spoiler (not shown).

The system is also operable in a droop mode as briefly discussed above where, in response to an electric control signal, through the solenoid valve 140, the actuator piston rod undergoes a negative stroke—i.e. the piston head moves away from the zero position in the opposite direction to when extending (direction B).

The present disclosure is concerned with providing actuator management when the system is in active droop mode but then electric power is lost.

As mentioned above, in extension (positive stroke) mode, when pressure is lost, the anti-extension valve operates to prevent extension of the piston rod, so that the rod is held at the zero position.

In droop (negative stroke) mode, however, this would actually prevent the rod moving in direction A back to the neutral position from the negative position.

As discussed above, if pressure stops being supplied to the actuator, in the droop (negative stroke) mode, the spoiler (or other component) will apply a downwards force due to its own weight. This can interfere with the movement of other components such as a wing flap since the anti-extension will be activated.

The present disclosure therefore provides a control system for a spoiler which provides the necessary safety features in the event of loss of electric power, when the spoiler is in negative stroke or droop mode. The arrangement ensures that even for negative stroke of the spoiler, and in the case of electrical failure, the spoiler will be re-centered automatically. This will permit the flap to retract without any interference.

As with conventional systems, the actuator 100 comprises a housing 200 within which a piston rod 300 is moveable according to the balance of pressure either side of the piston rod head 300b. The free end 300a of the piston rod 300 will be attached to a moveable surface e.g. the spoiler (not shown).

The direction of movement of the piston rod 300 relative to the housing 200 (and thus whether the rod and, also, the spoiler, is extended or retracted, is determined by the direction of flow of high pressure hydraulic fluid from a supply HP.

The actuator housing 200 has two ports 400 and 500 either side of the neutral or zero position of the piston head in the housing. If the spoiler is to be extended and, therefore, the rod is to be extended from the housing 200, the arrangement, responsive to an electric control signal, will control high pressure fluid HP to be injected into the chamber 200b (shown to the left of FIG. 2) which will force the piston rod 300 in the direction of arrow A. Low pressure fluid will be ejected from port 500 at chamber 200a to the LP reservoir.

If the piston rod 300 is to retract, then in response to the electric control signal, the high pressure fluid will be injected into chamber 200a via port 500 and this will force the piston head back into the chamber. Low pressure fluid will be ejected via port 400 back to the reservoir.

The direction of fluid flow is controlled by EHSV 120 which changes position in response to the control signal. For extension of the piston rod. EHSV takes position 120X creating a fluid line from HP to port 400 and from port 500 to LP. For retraction, EHSV takes up position 120Y so that a fluid path is created from HP to port 500 and from port 400 to LP.

Anti-extension valve 130 operates as described above with reference to FIG. 1 whereby the usual position is 130X to complete the fluid path to port 500, but in the event of the pressure at ports 130a and 130b being less than the set force of the spring 600 (usually 1.2 times Fstall—the predetermined stall force), the spring force drives the anti-extension valve to position 130Y to prevent extension of the piston rod.

The arrangement of the disclosure resolves the problems of, in particular, electrical failure in negative stroke, by providing a moveable stop 900 inside the actuator housing, behind the piston head 300b.

A normally open solenoid valve 140 is provided between the pressure source/reservoir, on one side, and the actuator housing on the other, to control fluid flow to and from the actuator chamber behind the moveable stop 900 via port 800 in the actuator housing to chamber 200b. The normally open solenoid valve will permit, when not powered, the application of high pressure in the chamber 200b.

The spoiler control arrangement in active positive stroke or extension mode, with no electrical or hydraulic failure, is shown in FIG. 1 and described above.

Figure 2:
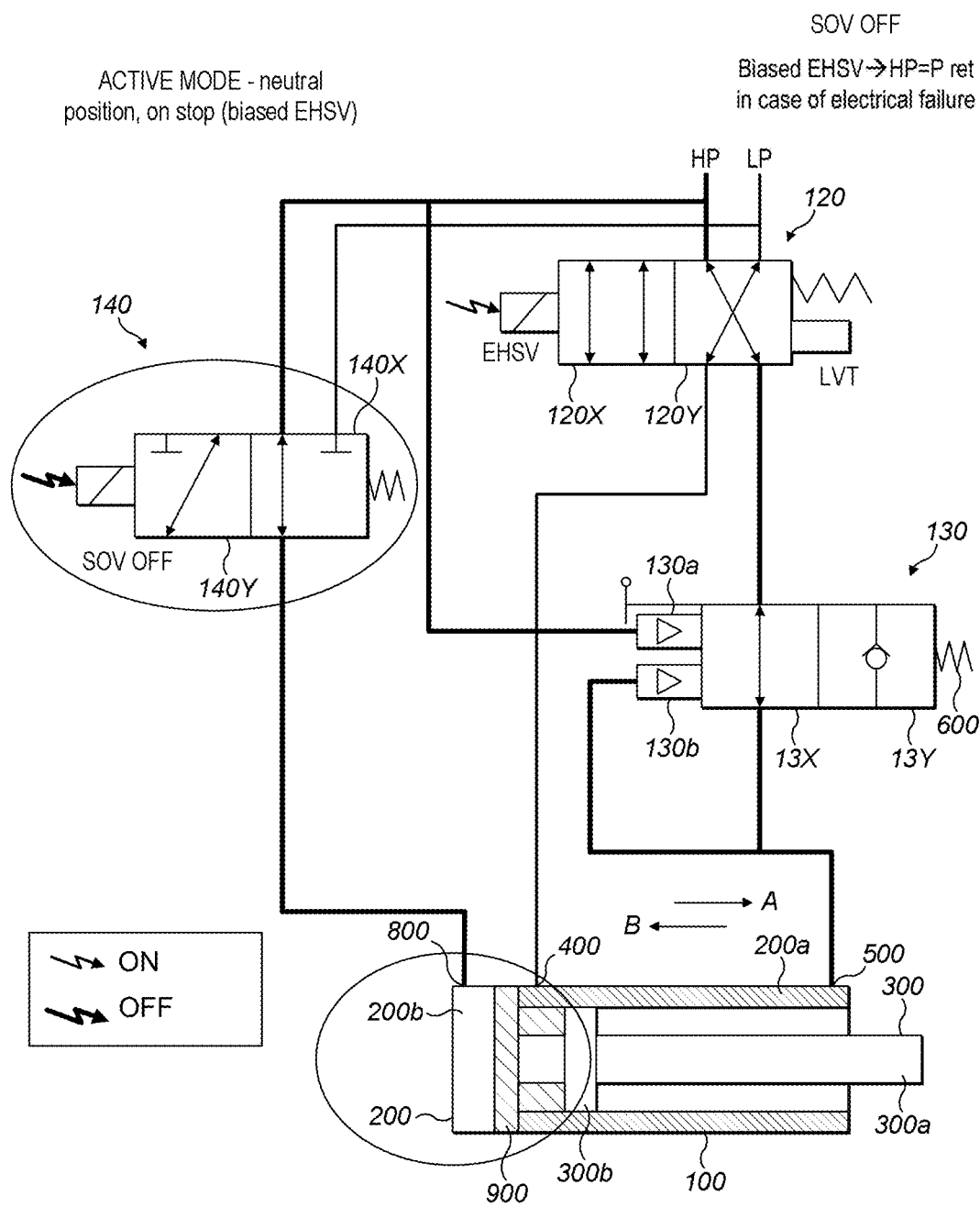
FIG. 2 is a schematic view of an actuator control valve arrangement according to the present disclosure in a first state.

FIG. 2 shows the arrangement when the spoiler is actively set to a neutral or zero position. The intention is therefore for the piston head to be located at the zero position, as shown. The stop 900 will therefore be positioned within the housing such that when the piston head abuts the stop, the head is at the neutral position. The stop 900 is maintained in position by the pressure chamber 200b (supplied by the solenoid 140). The area of the stop 900 is preferably greater than that of the piston 300 to ensure that the piston 300 will not drive the stop 900.

In response to the neutral position command, EHSV is set to position 120Y. Anti-extension valve 130 is not activated and is, therefore, at position 130X.

Solenoid valve 140 is in position 140X (here named 'OFF') this forming a fluid flow path from the high pressure source HP to port 800. The balance of the high pressure fluid at port 800 and the high pressure fluid at port 500 holds the stop 900 at the neutral position for the piston head.

Figure 3:
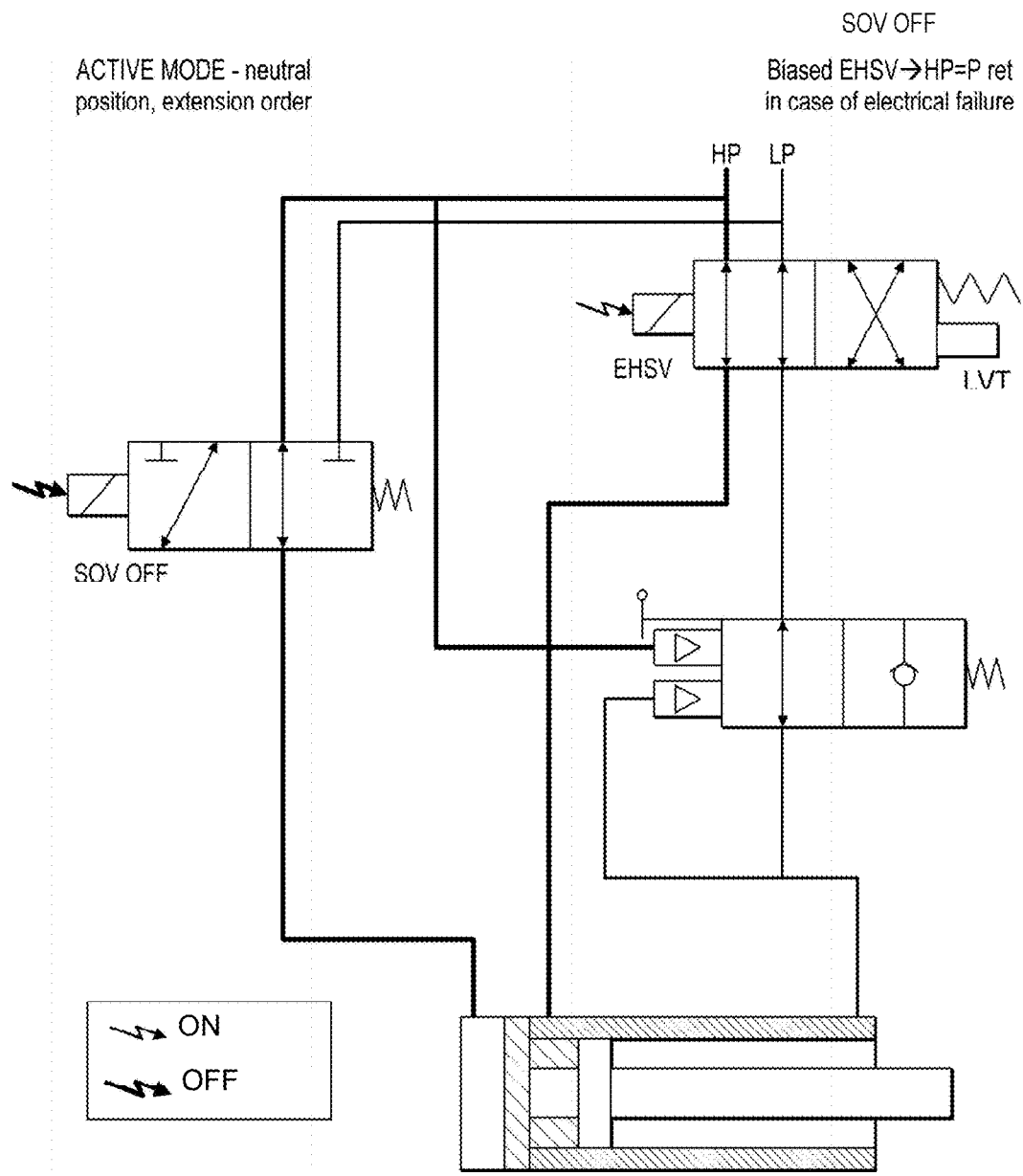
FIG. 3 is a schematic view of an actuator control valve arrangement according to the present disclosure in a second state.
Figure 4:
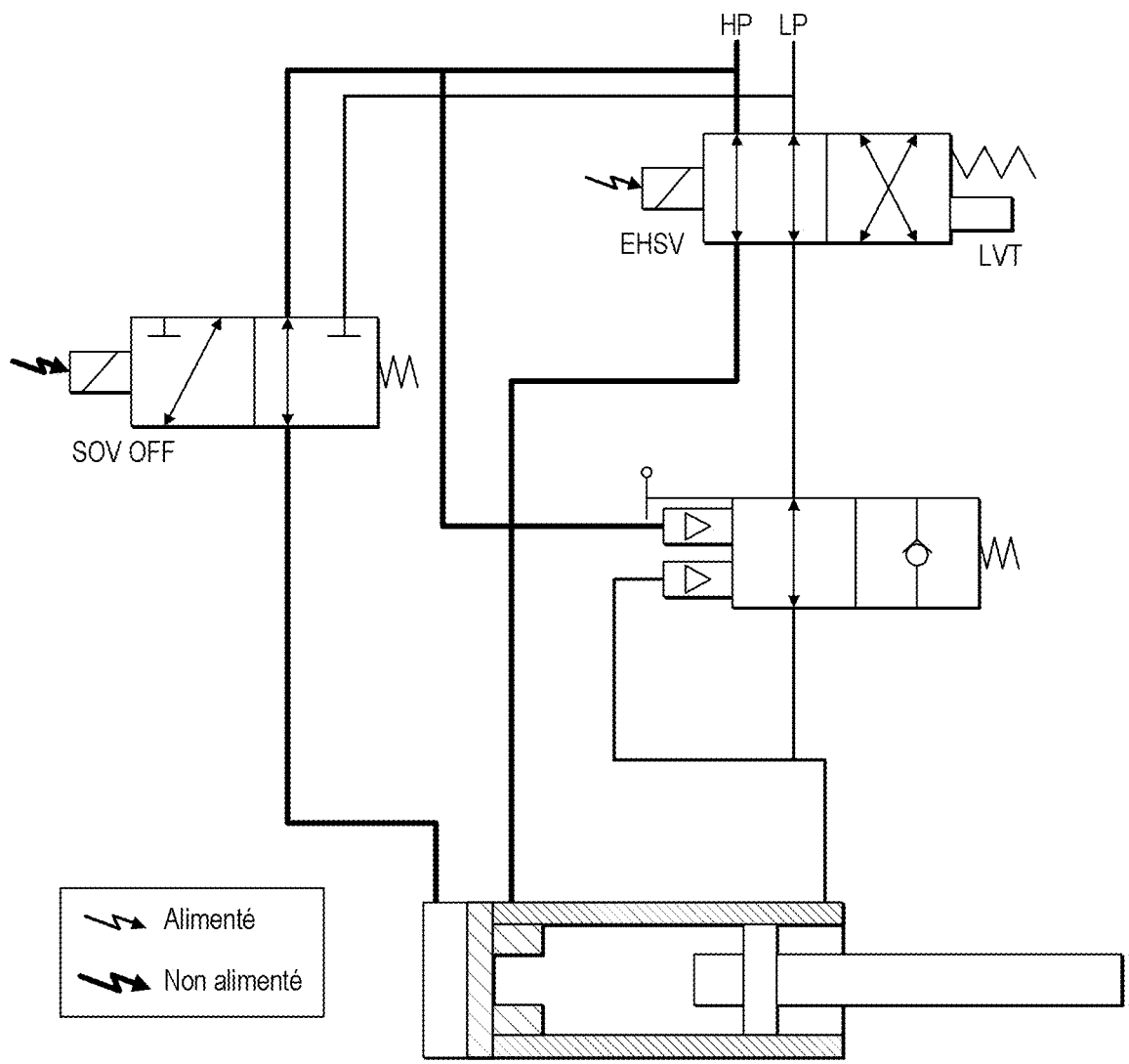
FIG. 4 is a schematic view of an actuator control valve arrangement according to the present disclosure in a third state.

If, as shown in FIG. 3, the system then receives a command to extend the piston rod (and spoiler), EHSV moves to position 120X so that high pressure fluid is applied to port 400 behind the piston head thus forcing the piston rod out from the housing in the direction of arrow A. High pressure is still also applied behind the stop 900 via port 800 so the stop remains in that position due to the balance of high pressure on either side of the stop. The piston will then move to extend from the housing with a positive stroke as shown in FIG. 4.

Figure 5:
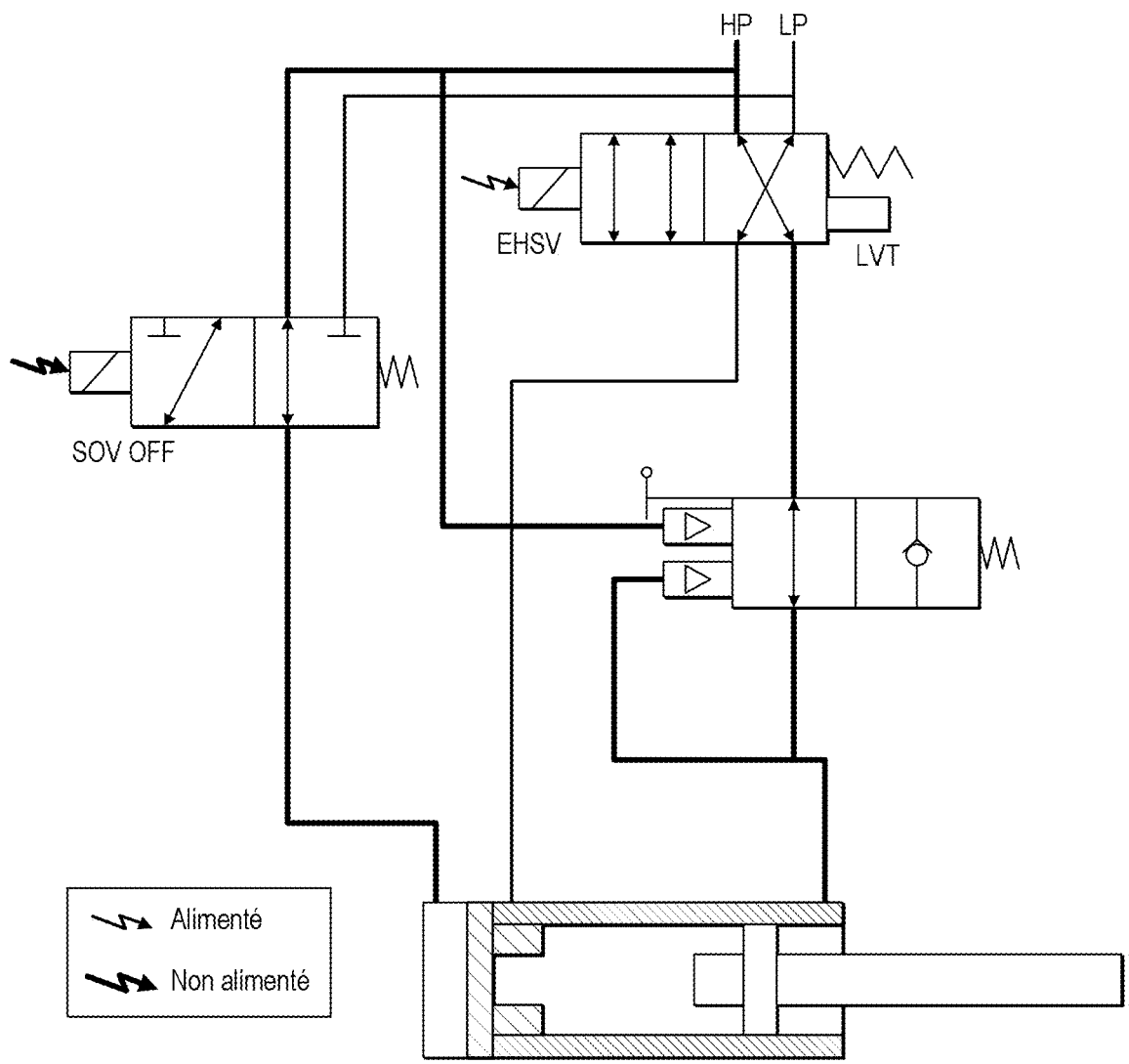
FIG. 5 is a schematic view of an actuator control valve arrangement according to the present disclosure in a fourth state.

If the system then receives a command to retract (FIG. 5), EHSV switches to position 120Y so that a fluid path is formed from the high pressure supply HP to chamber 200a via port 500 forcing the piston head back towards the stop 900. The stop 900 is still held at the neutral position via the path through the solenoid valve 140.

Figure 6:
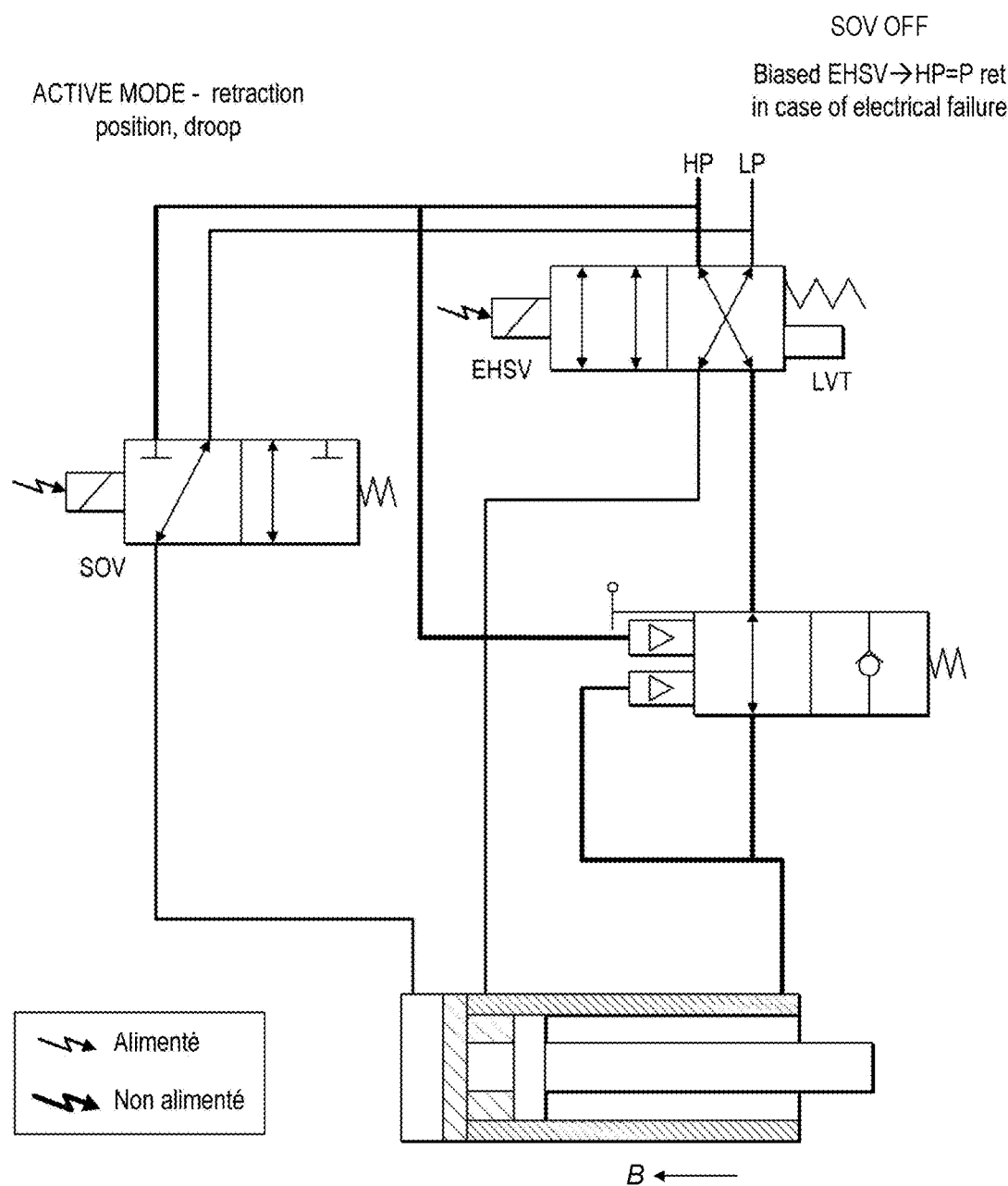
FIG. 6 is a schematic view of an actuator control valve arrangement according to the present disclosure in a fifth state.
Figure 7:
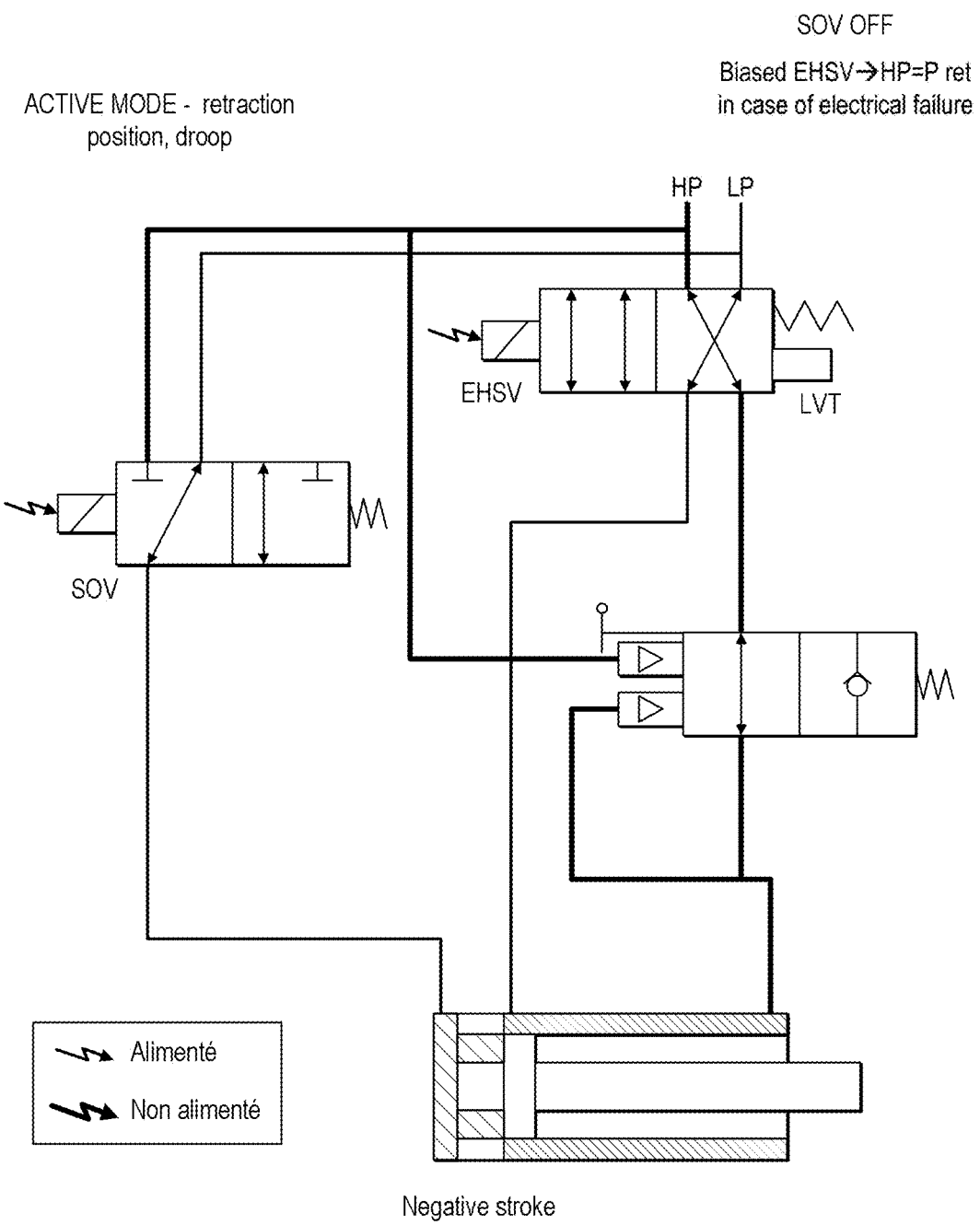
FIG. 7 is a schematic view of an actuator control valve arrangement according to the present disclosure in a sixth state.

If a retraction command is sent to the EHSV (120) to cause the actuator to operate in negative stroke with respect to the neutral position (FIG. 6), the solenoid valve 140 switches to position 140Y (here named 'OFF') which then closes the fluid path from HP to port 800 and instead creates a fluid path between port 800 and the low pressure reservoir LP. Because of this change, the pressure in chamber 200b is now less than that in chamber 200a where high pressure fluid is injected via port 500, and this pressure differential causes the stop 900 to move further into chamber 200b away from the neutral position. This then allows the piston head to move further in a negative stroke direction within the housing (FIG. 7).

Figure 8:
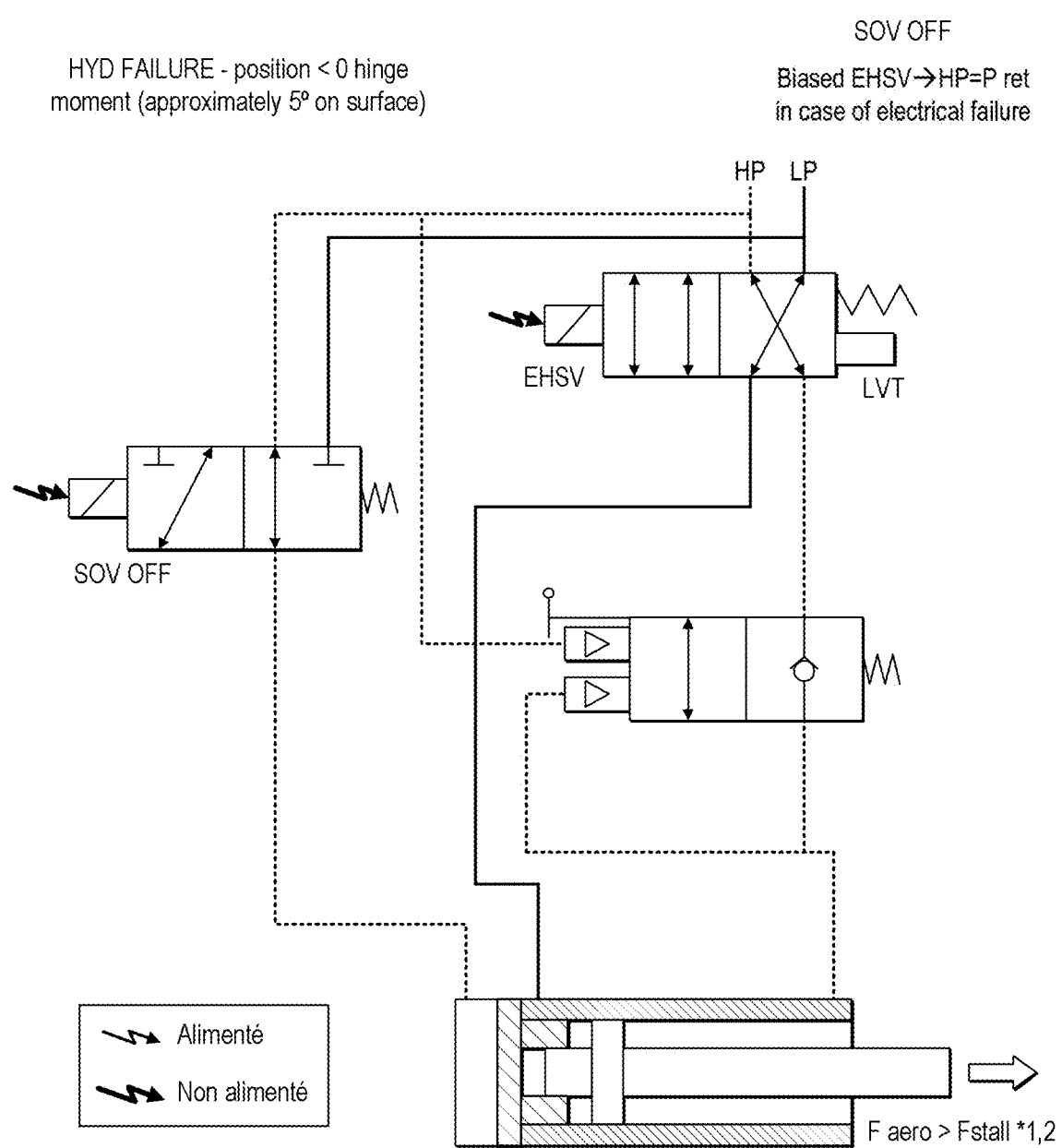
FIG. 8 is a schematic view of an actuator control valve arrangement according to the present disclosure in a seventh state.

FIG. 8 shows the situation when a retraction command has been sent to EHSV 120 (as in FIG. 5) but there is a hydraulic failure—i.e. the high pressure HP fails (shown as dashed lines in FIG. 8).

Figure 9:
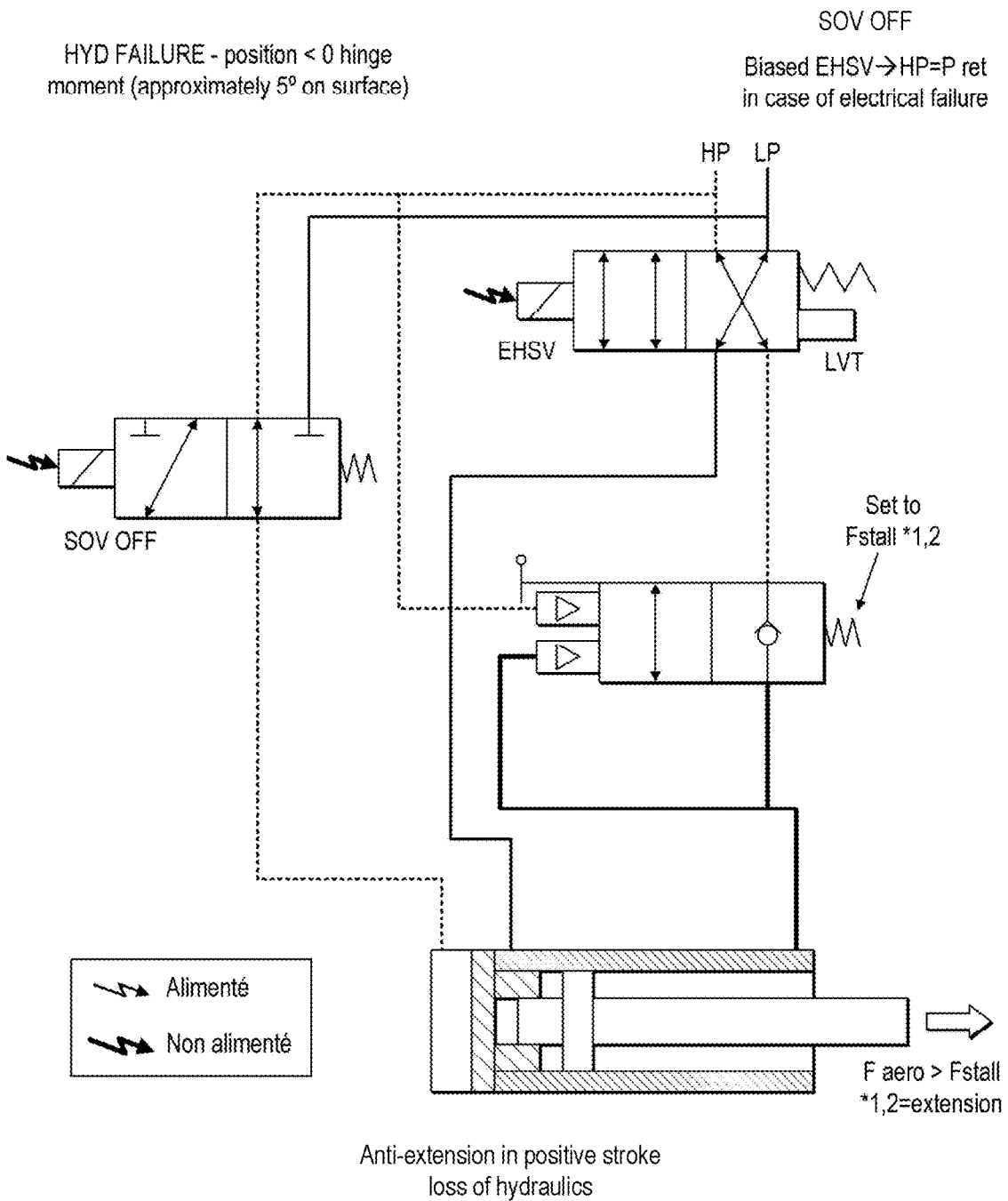
FIG. 9 is a schematic view of an actuator control valve arrangement according to the present disclosure in a eighth state.

If the actuator is in positive stroke when the pressure fails, the aerodynamic pressure Faero is greater than the set force of the anti-extension valve spring 600—i.e. greater than 1.2*Fstall. The piston rod 300 will still extend. (FIG. 9).

Figure 10:
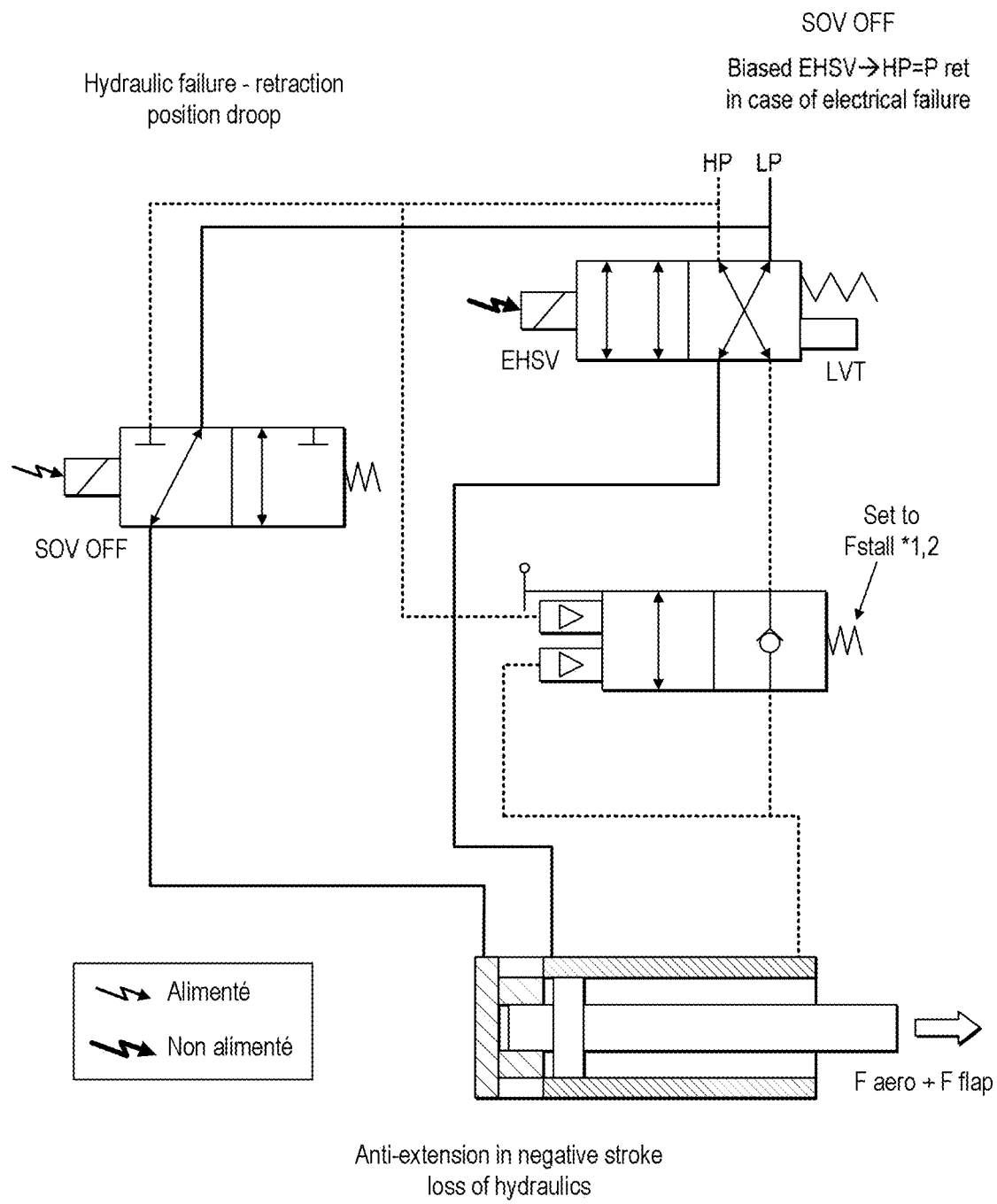
FIG. 10 is a schematic view of an actuator control valve arrangement according to the present disclosure in a ninth state.

If the actuator is in negative stroke, where the moveable stop is retracted into the housing (see FIG. 10) and there is a pressure failure, the rod could extend and push down on or interfere with movement of the wing flap. Here, the anti-extension valve will trip to position 130Y to prevent undesired extension and interference with the flap. The flap will need to overcome the load set by the anti-extension valve when centering flap position is requested.

Figure 11:
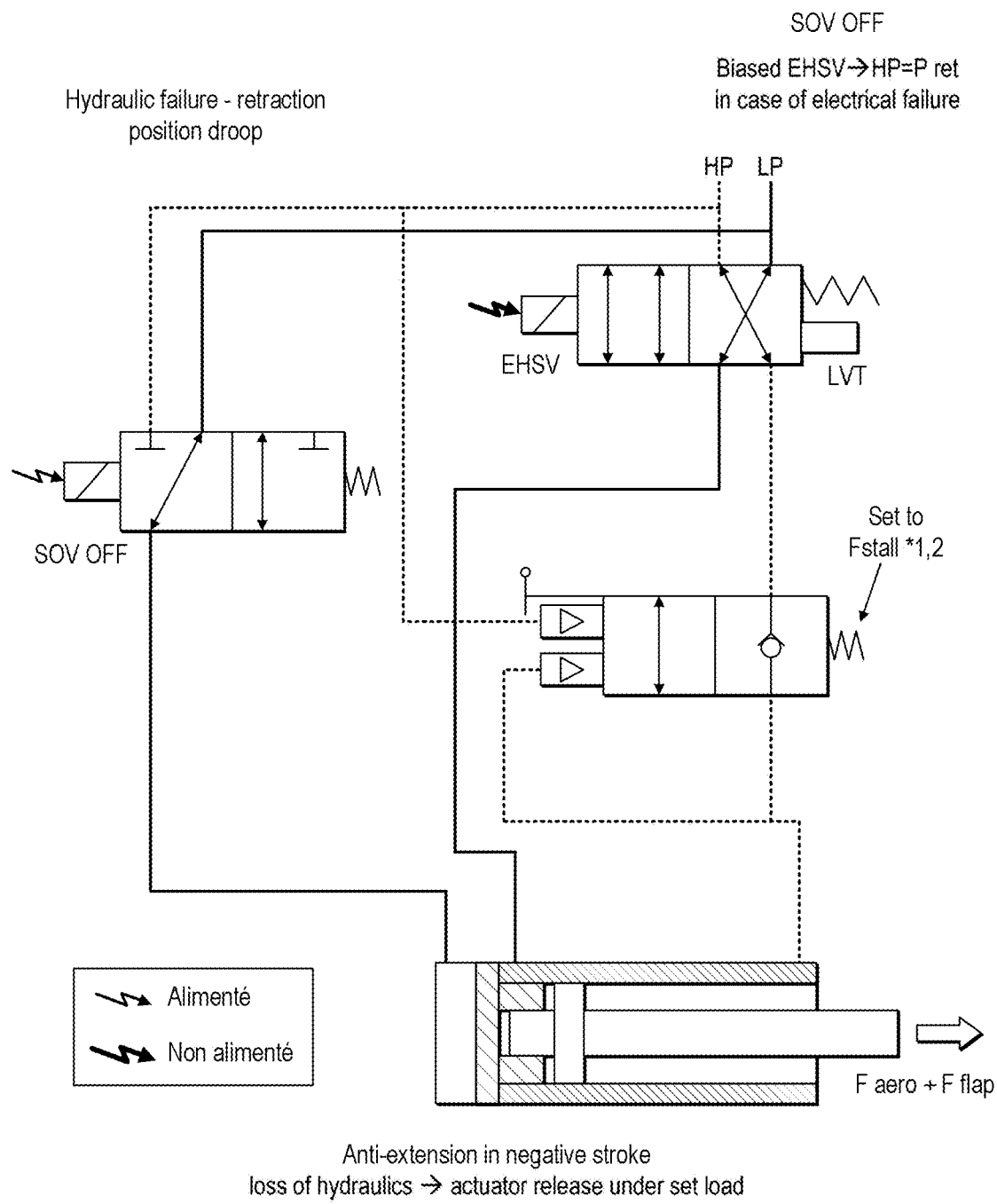
FIG. 11 is a schematic view of an actuator control valve arrangement according to the present disclosure in a tenth state.

FIG. 11 shows the system in negative stroke. Anti-extension valve 130 operates as described above with reference to FIG. 1 whereby the usual position is 130X to complete the fluid path to port 500, but in the event of pressure at ports 130a and 130b being less than the set force of the spring 600 (usually 1.2 times the predetermined stall force Fstall), the spring force drives the anti-extension valve 130 to position 130Y to prevent extension of the piston rod.

Figure 12:
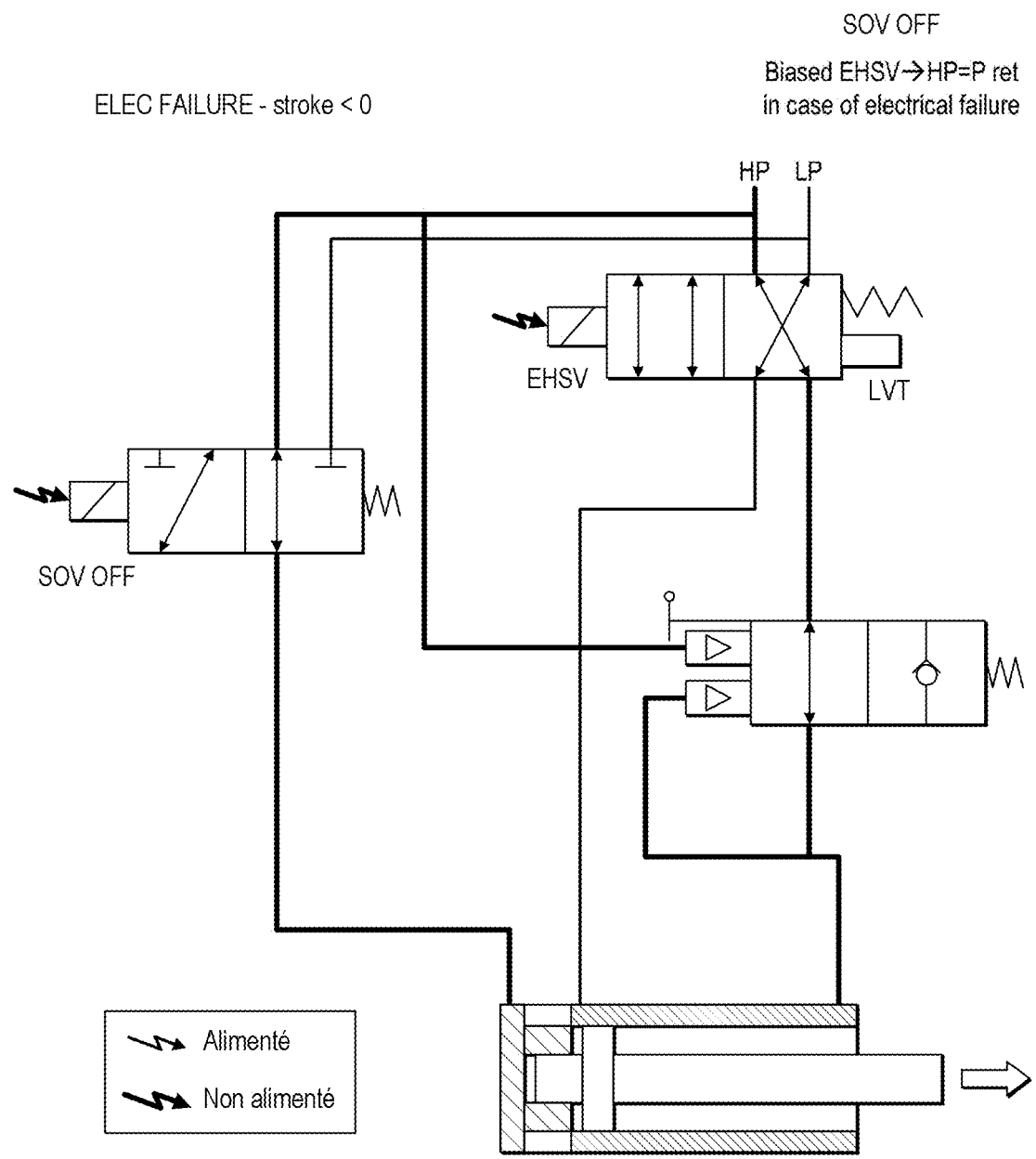
FIG. 12 is a schematic view of an actuator control valve arrangement according to the present disclosure in a eleventh state.

FIG. 12 shows the situation where the actuator is in negative stroke and there is an electrical failure. The electrical command to EHSV 120 fails and EHSV is biased such that it defaults to position 120Y (the retract position) in the case of electrical failure. In this configuration, high pressure is applied to chamber 200a via port 500 but high pressure is also applied to port 800 via servovalve 140 thus causing the movable stop to recenter.

Figure 13:
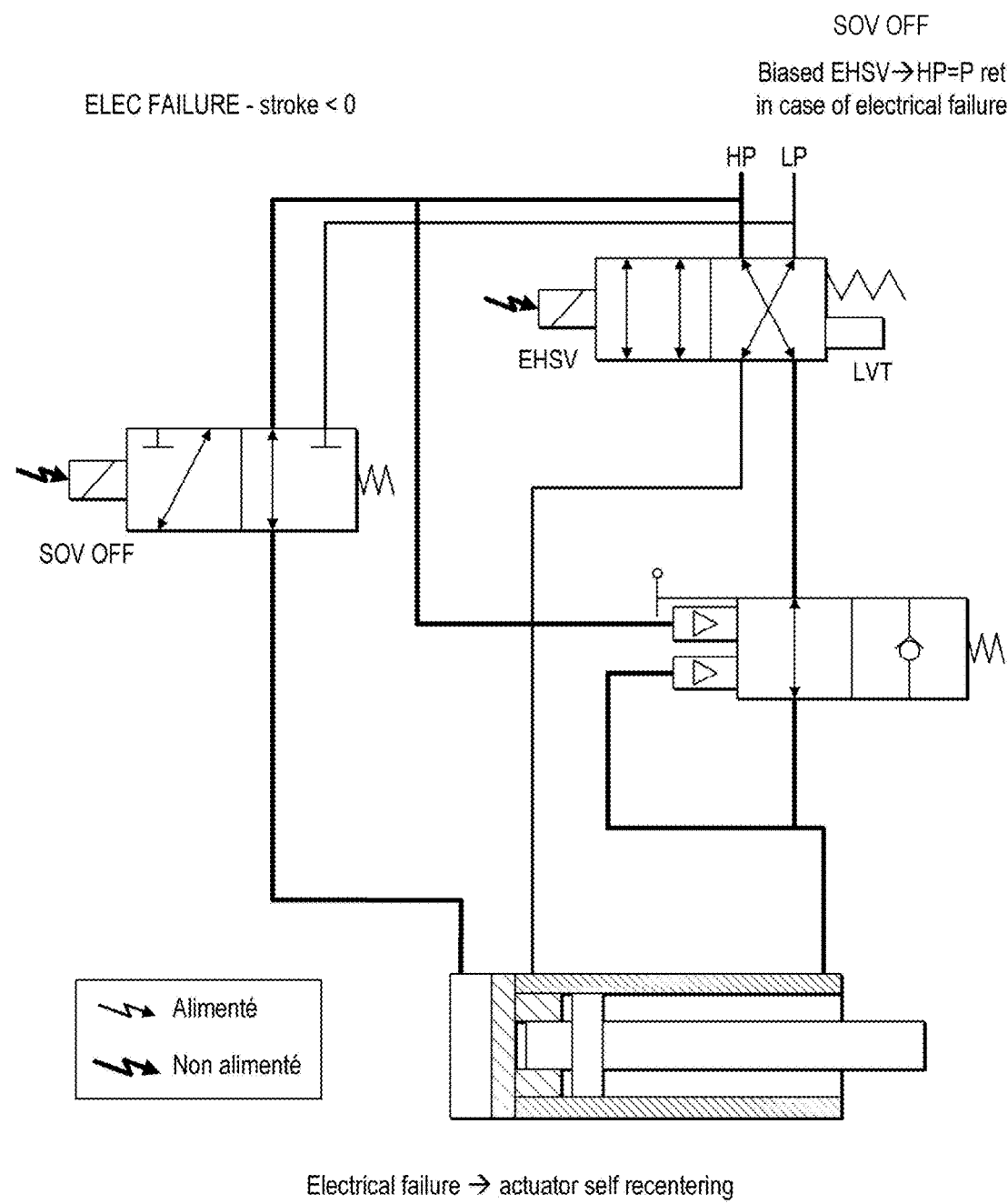
FIG. 13 is a schematic view of an actuator control valve arrangement according to the present disclosure in a twelfth state.

FIG. 13 shows the situation when the actuator is in positive stroke where, again, the stop will recenter.

Accordingly, the combination of the solenoid valve and the moveable stop will ensure that in the case of electrical failure, the actuator will always recenter regardless of whether the actuator is in positive or negative stroke.

What is claimed is:

1. An actuator control arrangement comprising:
   a hydraulic actuator having a housing and a piston rod axially moveable within the housing between a neutral position, a retracted position and an extended position with respect to the housing in response to application of pressure to the piston rod;
   a stop disposed within and extending across an interior of the housing the stop arranged to define a first chamber of the housing on the piston side of the stop and a second chamber of the housing on the other side of the stop, to limit the extent of movement of the piston rod into the housing, the stop moveable between a neutral position and a retracted position;
   a solenoid valve arranged between a pressure source and the actuator, the solenoid valve being biased in a first mode when not activated by an electrical control signal and switchable from the first mode to a second mode in response to an electric control signal, wherein, in the first mode, the solenoid valve creates a fluid flow path from the pressure source to the actuator so as to locate the stop in its neutral position and in the second mode, the solenoid valve creates a fluid flow path to release pressure from the actuator to permit the stop to move to its retracted position, and
   an electrohydraulic servovalve, EHSV, between the pressure source and the actuator to control the direction of pressurized fluid to the actuator in response to the electric control signal;
   wherein the EHSV is moveable between a first position in which high pressure fluid is directed from the fluid source to a first chamber of the actuator to cause extension of the piston rod and a second position whereby high pressure fluid is directed to a second chamber of the actuator to cause retraction of the piston rod with respect to the housing;
   wherein, in a droop mode, in response to an electrical control signal, the EHSV is in the second position and the solenoid valve is activated to the second mode so releasing pressure from the second chamber to allow the stop to retract from the neutral position, and wherein, in the event of failure of the electrical control signal, the solenoid valve returns to the first mode wherein pressure is provided from the pressure source to the second chamber to cause the stop to return to the neutral position.

2. The actuator control arrangement of claim 1, wherein a default position of the EHSV is the second position.

3. The actuator control arrangement of claim 1, further comprising:
   an anti-extension valve provided between the EHSV and the actuator configured to move between a first position in which a fluid path is created between the EHSV and the actuator and a second, anti-extension position to prevent extension of the piston rod with respect to the housing in the event of pressure loss.

4. The actuator control arrangement of claim 1, wherein in the event of failure of the electric control signal, the stop returns from its retracted position to its neutral position.

5. A spoiler control arrangement for an aircraft, comprising:
   a spoiler moveable relative to a wing surface; and
   an actuator control arrangement as claimed in claim 1, the actuator arranged to move the spoiler by movement of the piston rod.

* * * * *